United States Patent [19]
Gosnell

[11] 3,773,273
[45] Nov. 20, 1973

[54] FRICTION ADJUSTABLE CHART ROLL OR PAPER GUIDE APPARATUS

[75] Inventor: Arvine T. Gosnell, Indianapolis, Ind.

[73] Assignee: Esterline Corporation, Indianapolis, Ind.

[22] Filed: Dec. 28, 1970

[21] Appl. No.: 101,448

[52] U.S. Cl................ 242/71.9, 74/531, 287/52.08
[51] Int. Cl............................................. B65h 75/24
[58] Field of Search.................. 242/71.9, 73, 118.5; 287/52.08; 74/531

[56] References Cited
UNITED STATES PATENTS

| | | | |
|---|---|---|---|
| 3,000,231 | 9/1961 | Cochran | 74/531 X |
| 3,363,854 | 1/1968 | Becker, Jr. | 242/71.9 X |
| 1,816,503 | 7/1931 | Uff | 242/71.9 X |

FOREIGN PATENTS OR APPLICATIONS

| | | | |
|---|---|---|---|
| 1,304,567 | 8/1962 | France | 242/118.5 |

Primary Examiner—Billy S. Taylor
Attorney—Woodard, Weikart, Emhardt & Naughton

[57] ABSTRACT

Two parallel rollers with strip chart rolled thereon and extending therebetween, employ fixed guide discs at one side of the chart, and adjustable guide discs at the other side of the chart. Radially projecting buttons in the adjustable discs engage the rollers, being urged inwardly by "O" rings encircling the adjustable discs.

1 Claim, 5 Drawing Figures

INVENTOR
ARVINE T. GOSNELL
ATTORNEYS
Woodard, Weikart, Emhardt, & Naughton

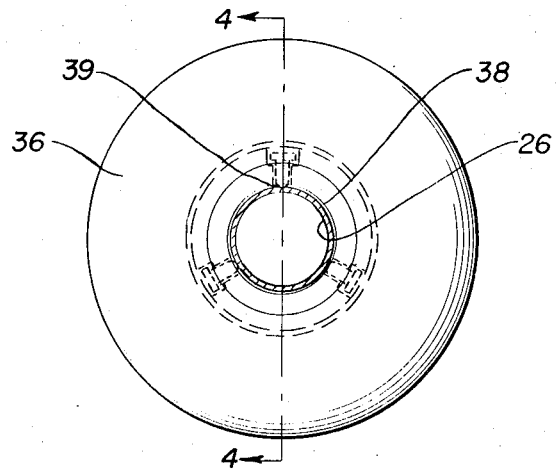
Fig. 3
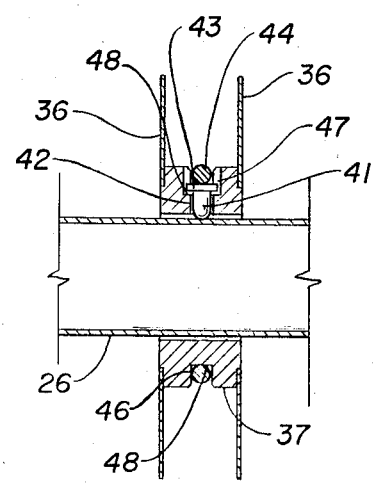
Fig. 4
Fig. 5
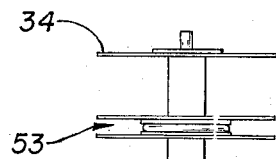
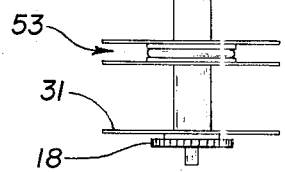
INVENTOR
ARVINE T. GOSNELL
ATTORNEYS
Woodard, Weikart, Emhardt & Naughton

FRICTION ADJUSTABLE CHART ROLL OR PAPER GUIDE APPARATUS

BACKGROUND OF THE INVENTION

1. Field of the Invention

This invention relates generally to strip material handling machines, and more particularly to strip chart inspection machines, and means for guiding the chart paper thereon and accommodating various wdths of chart paper.

2. Description of the Prior Art

Although it is well known to move strip material from one roller to another, it is desirable to be able to conveniently mount and move strip chart records from one roller to another, for inspection of the chart as it is being wound from one roller to the other.

There is a considerable variety in widths of chart paper used on recording instruments, depending upon the nature of the instrument, its size, and the purpose of the record. Chart paper used on one instrument may be 12 inches wide, while the chart paper used on another instrument might be less than 2 inches wide. In a machine designed to facilitate inspection of strip charts, it is desirable to be able to readily adapt from a wide chart to a narrow chart. In any case, there should be guides at both sides on each of the rollers employed.

Adjustable collars on shafts are well know, but very often they employ devices such as set screws for securing them to the shaft. Such devices are not desirable for use with chart paper spools because of the possibility of damage of the spool by the set screw, and the possibility or likelihood of damage to the chart in the event the collar is slipped over a portion thereof. Also they typically require use of tools, and are susceptible to improper installation by operators who may tighten them excessively, or insufficiently. Thus a need has remained for an improved guide for chart rollers.

SUMMARY OF THE INVENTION

Described briefly, in a typical embodiment of the present invention, a guide member having a central aperture is received on a chart roller core, the core passing through the aperture. An annular groove is provided in the perimeter of the guide member and a transverse aperture extends radially inward between the groove and the central aperture. A friction button is received in the transverse aperture, and a resilient garter member is received in the annular groove and urges the button into engagement with the core, to maintain the position of the guide member on the core. While the frictional engagement under urging of the garter member is sufficient to prevent the guide member from displacement by the chart paper, it does permit manual adjustment of the guide member axially along the core to accommodate different widths of chart paper.

BRIEF DESCRIPTION OF THE DRAWINGS

FIG. 3 is an enlarged section through the shaft, the section being taken at line 3—3 in FIG. 1 and viewed in the direction of the arrows.

FIG. 4 is a cross section through the guide discs taken at line 4—4 in FIG. 3 and viewed in the direction of the arrows.

FIG. 5 is a top plan view of a roller similar to that in FIG. 1, but employing two adjustable side guide discs for the chart paper.

DESCRIPTION OF THE PREFERRED EMBODIMENT

Figures 1, 2:
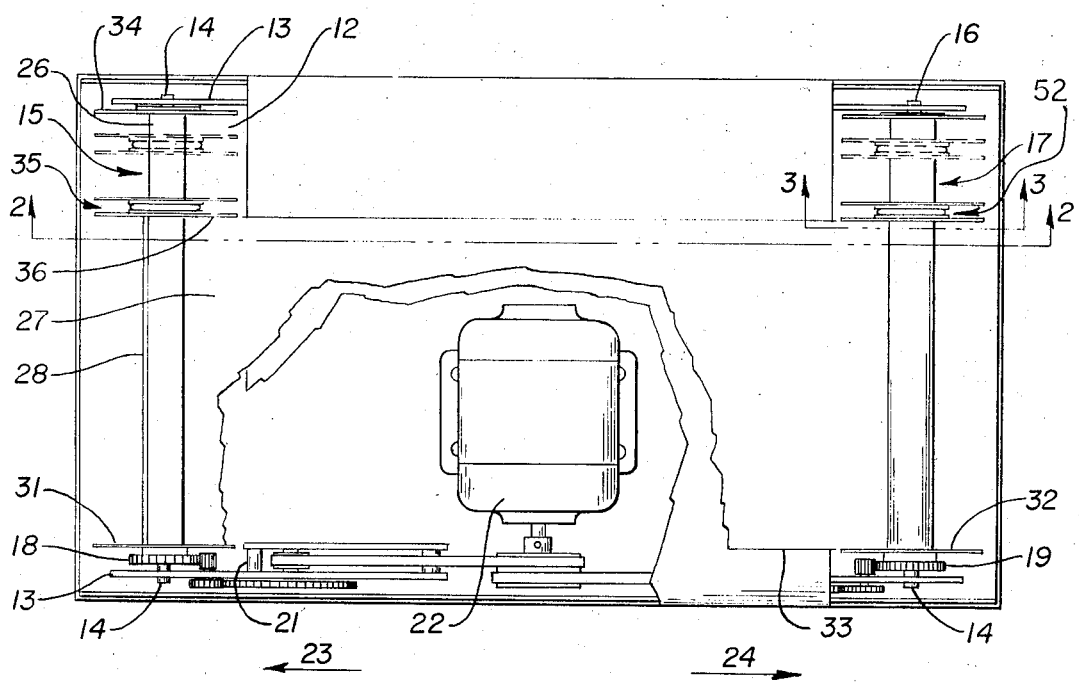
FIG. 1 is a plan view of principal structural components of a chart inspection machine employing adjustable guide apparatus according to a typical embodiment of the present invention.
FIG. 2 is a section taken at line 2—2 in FIG. 1 and viewed in the direction of the arrows.

Referring now to FIG. 1, a machine frame may be provided with a bottom plate 12 having upturned side flanges 13 having four notches, one near each corner, to receive the shaft 14 of a chart roller 15 at one end, and the shaft 16 of a chart roller 17 at the other end. Both chart rollers can be the same in construction, and each has a gear at one end thereof such as the gear 18 on roller 15 and gear 19 on roller 17. These gears mesh with suitable gearing on the gear train holder 21 and operable by a motor 22 to enable driving the rollers to move the paper in the direction of arrow 23 or to reverse it for movement in the direction of arrow 24.

In addition to the central shaft 14 received in the machine frame, the roller may have a core 26 upon which the chart paper 27 is rolled as at 28. The central portion of the paper spanning the space between the two rollers is supported by a platen 29 to facilitate marking thereon, if desired, during inspection.

The roller 15 includes a disc 31 affixed to the core or shaft at the one end, and likewise the roller 17 includes the disc 32 affixed thereto. These discs serve as guides for one edge 33 of the chart paper as it moves from one roller to the other. Because the chart paper is not of sufficient width to extend the total distance from the disc 31 to the disc 34 on core 26, an adjustable guide assembly is shown at 35 mounted on the core 26.

In the illustrated embodiment of the invention, the assembly 35, as is best shown in FIGS. 3 and 4, includes a generally cylindrical hub having a cylindrical outer surface 37 and a cylindrical center aperture 38. Two of discs 36 are received on the hub and secured thereto, by a suitable adhesive, for example. The roller core which happens to be the tube 26 in this example, is disposed in the central aperture and is engaged by the spherical inner end 39 of each of three friction buttons 41 received in the equally spaced, radially extending apertures 42 which are transverse to the direction of the axis of the guide assembly and tube. This button has a cylindrical head 43, the outer face of which is engaged by a garter type of resilient member which, in the illustrated example is an "O" ring 44. This ring is received in a circumferential groove 46 in the outer circumference 37 of the hub. The head 43 of each friction button is received in a recess 47 in the bottom 48 of the groove 46 and intercepting the transverse aperture 42, thus providing a shoulder at 48 to limit the extent of inward travel of the button 41 under urging of the "O" ring when the disc 36 is removed from the tube if that need ever be done. Meanwhile, with the guide disc received on the tube 26, the inner ends of the friction buttons frictionally engage the tube. Because of this both rotational and axial movement of the guide on the tube are generally prevented. Certainly the amount of inward urging by the "O" ring is sufficient to prevent the chart paper from moving the disc on the tube as the chart is rolled from one roller to the other. Nevertheless the disc can be moved axially along the tube by hand when desired, to accommodate a different width of chart paper.

An adjustable guide assembly 52 is also provided on the roller assembly 17. This may be identical to the adjustable guide apparatus just described. In FIG. 5, two adjustable guide members 53, identical to that described above, may be employed on the spool to guide both edges of the paper if, for some reason, this might be desirable.

Of course it should be understood that the core employed for rolling the paper, may be a rod, roller, tube or other suitable structure.

While the invention has been disclosed and described in some detail in the drawings and foregoing description, they are to be considered as illustrative and not restrictive in character, as other modifications may readily suggest themselves to persons skilled in this art and within the broad scope of the invention.

The invention claimed is:
1. Guide apparatus comprising:
a guide member having a circular central aperture for reception on an elongated core;
a circular groove in the perimeter of said member and surrounding said aperture;
a transverse aperture extending between said central aperture and said groove;
a button received in said transverse aperture;
a garter type resilient ring in said groove and urging a portion of said button into projection into said central aperture,
said transverse aperture including a recess projecting radially inward from the bottom of said groove and terminating in a shoulder spaced outward from the inner wall of said central aperture,
and said button including a head received in said recess for limiting extension of said button into said central aperture.

* * * * *